US011330822B2

(12) United States Patent
Liu et al.

(10) Patent No.: US 11,330,822 B2
(45) Date of Patent: May 17, 2022

(54) LIQUID CLOTHIANIDIN COMPOSITIONS AND METHODS OF THEIR USE

(71) Applicant: Valent U.S.A. LLC, Walnut Creek, CA (US)

(72) Inventors: Xiaomeng Liu, Walnut Creek, CA (US); Xiaonan Duan, Fremont, CA (US); Alice Wei, Dublin, CA (US)

(73) Assignee: VALENT U.S.A., LLC, Walnut Creek, CA (US)

( * ) Notice: Subject to any disclaimer, the term of this patent is extended or adjusted under 35 U.S.C. 154(b) by 219 days.

(21) Appl. No.: 16/196,513

(22) Filed: Nov. 20, 2018

(65) Prior Publication Data

US 2019/0150444 A1 May 23, 2019

Related U.S. Application Data

(60) Provisional application No. 62/588,919, filed on Nov. 21, 2017.

(51) Int. Cl.
| | | |
|---|---|---|
| *A01N 43/78* | (2006.01) | |
| *A01N 25/04* | (2006.01) | |
| *C05D 9/00* | (2006.01) | |
| *A01N 51/00* | (2006.01) | |
| *C05G 3/60* | (2020.01) | |
| *A01P 15/00* | (2006.01) | |

(52) U.S. Cl.
CPC .............. *A01N 43/78* (2013.01); *A01N 25/04* (2013.01); *A01N 51/00* (2013.01); *A01P 15/00* (2021.08); *C05D 9/00* (2013.01); *C05G 3/60* (2020.02)

(58) Field of Classification Search
CPC ........ A01N 43/78; A01N 51/00; A01N 25/04; C05G 3/60; C05D 9/00; A01P 15/00
See application file for complete search history.

(56) References Cited

U.S. PATENT DOCUMENTS

| 8,889,721 B2 | 11/2014 | Jeffries et al. |
|---|---|---|
| 2006/0166898 A1 | 7/2006 | Chen |
| 2008/0234328 A1* | 9/2008 | Schlatter ................ A01N 47/40 514/341 |
| 2008/0318881 A1 | 12/2008 | Torrent-Parker et al. |

FOREIGN PATENT DOCUMENTS

| CN | 101179938 A | 5/2012 |
|---|---|---|
| WO | 2007005470 A2 | 1/2007 |

OTHER PUBLICATIONS

International Preliminary Report on Patentability and Written Opinion dated May 26, 2020.
International Search Reported dated Feb. 1, 2019.

* cited by examiner

*Primary Examiner* — John Pak
*Assistant Examiner* — Andriae M Holt
(74) *Attorney, Agent, or Firm* — Wood, Phillips, Katz, Clark & Mortimer

(57) ABSTRACT

The present invention is directed to agricultural compositions containing clothianidin, at least one dispersant selected from the group consisting of sodium alkyl naphthalene sulfonate condensate, alkyl polyglycoside and a mixture thereof, an inorganic compound selected from the group consisting of attapulgite, magnesium aluminum silicate, silicon dioxide and aluminum oxide and glycerol. The present invention is further directed to compositions containing clothianidin, at least one dispersant selected from the group consisting of sodium alkyl naphthalene sulfonate condensate, alkyl polyglycoside and a mixture thereof, an inorganic compound selected from the group consisting of attapulgite, magnesium aluminum silicate, silicon dioxide and aluminum oxide, glycerol and at least one liquid fertilizer. The present invention is further directed to a method of protecting crop plants by mixing a composition containing clothianidin, at least one dispersant selected from the group consisting of sodium alkyl naphthalene sulfonate condensate, alkyl polyglycoside and a mixture thereof, an inorganic compound selected from the group consisting of attapulgite, magnesium aluminum silicate, silicon dioxide and aluminum oxide and glycerol with at least one liquid fertilizer and applying the mixture to the plant, an area where the plant is growing or an area where the plant is intended to grow.

7 Claims, No Drawings

LIQUID CLOTHIANIDIN COMPOSITIONS AND METHODS OF THEIR USE

FIELD OF THE INVENTION

The present invention is related to agricultural compositions containing clothianidin, at least one dispersant selected from the group consisting of sodium alkyl naphthalene sulfonate condensate, alkyl polyglycoside and a mixture thereof, an inorganic compound selected from the group consisting of attapulgite, magnesium aluminum silicate, silicon dioxide and aluminum oxide and mixtures thereof and glycerol. The present invention is further related to compositions containing clothianidin, at least one dispersant selected from the group consisting of sodium alkyl naphthalene sulfonate condensate, alkyl polyglycoside and a mixture thereof, an inorganic compound selected from the group consisting of attapulgite, magnesium aluminum silicate, silicon dioxide and aluminum oxide and mixtures thereof, glycerol and at least one liquid fertilizer. The present invention is further related to a method of protecting crop plants by mixing a composition containing clothianidin, at least one dispersant selected from the group consisting of sodium alkyl naphthalene sulfonate condensate, alkyl polyglycoside and a mixture thereof, an inorganic compound selected from the group consisting of attapulgite, magnesium aluminum silicate, silicon dioxide and aluminum oxide and mixtures thereof and glycerol with at least one liquid fertilizer and applying the mixture to the plant, an area where the plant is growing, or an area where the plant is intended to grow.

BACKGROUND OF THE INVENTION

Plant growers continually strive to produce healthy plants. The health of crop plants is especially critical because health directly impacts yield. Crop plant growers routinely apply liquid fertilizers to the area where the plants are growing or will grow (these areas will be referred to as "the field") in order to produce healthier plants.

Crop plant growers also often apply insecticides to the field. One especially effective insecticide is clothianidin. Clothianidin is a neonicotinoid, which work by binding to nicotinic acetylcholine receptors in insect cells causing paralysis, and then death. Clothianidin is an alternative to other pesticides such as organophosphate and carbamate pesticides, which are harmful to mammals.

Each application of an agricultural product to the field requires use of large equipment, transportation of the equipment, and skilled workers to operate the equipment. It is preferable to crop growers to apply as many products at one time as possible in order to minimize the use of these expensive resources.

In the past, it was very difficult to formulate insecticidal premixes that would be compatible with liquid fertilizers. Recently, a product was developed by FMC Corporation that allows insecticides to be applied with liquid fertilizers (see U.S. Pat. No. 8,029,827). However, when an insecticidal premix and liquid fertilizers are mixed, an unsatisfactory residue may be produced. This residue may lead to clogging of sprayers and will not allow the product to be effectively dispersed in the field.

Accordingly, there is a need in the art for an improved formulation that allows crop growers to apply insecticides and fertilizers at the same time. This improved formulation should produce very little to no residues, and should be non-phytotoxic, storage stable, and highly effective.

SUMMARY OF THE INVENTION

In one aspect, the present invention is directed to agricultural compositions comprising clothianidin, at least one dispersant selected from the group consisting of sodium alkyl naphthalene sulfonate condensate, alkyl polyglycoside and a mixture thereof, an inorganic compound selected from the group consisting of attapulgite, magnesium aluminum silicate, silicon dioxide and aluminum oxide and glycerol.

In another aspect, the present invention is directed to agricultural compositions comprising clothianidin, at least one dispersant selected from the group consisting of sodium alkyl naphthalene sulfonate condensate, alkyl polyglycoside and a mixture thereof, an inorganic compound selected from the group consisting of attapulgite, magnesium aluminum silicate, silicon dioxide and aluminum oxide and mixtures thereof, glycerol and at least one liquid fertilizer.

In another aspect, the present invention is directed to methods of protecting crop plants comprising:

- mixing an agricultural composition of the present invention with at least one liquid fertilizer to form a mixture; and
- applying the mixture to the plant, an area where the plant is growing, or an area where the plant is intended to grow.

In another aspect, the present invention is directed to methods of controlling a pest comprising:

- mixing an agricultural composition of the present invention with at least one liquid fertilizer to form a mixture; and
- applying the mixture to the pest or the pest's environment.

DETAILED DESCRIPTION OF THE INVENTION

Applicant unexpectedly discovered that formulating clothianidin with at least one dispersant selected from the group consisting of sodium alkyl naphthalene sulfonate condensate, alkyl polyglycoside and a mixture thereof, an inorganic compound selected from the group consisting of attapulgite, magnesium aluminum silicate, silicon dioxide and aluminum oxide and glycerol allowed for clothianidin to be mixed with liquid fertilizers. These excipients provide stable formulations that produce very little or no residue when mixed with liquid fertilizers and are storage stable. This finding was especially unexpected due to the well-known difficultly of formulating insecticide premixtures that are compatible with liquid fertilizers.

In one embodiment, the present invention is directed to agricultural compositions comprising clothianidin, at least one dispersant selected from the group consisting of sodium alkyl naphthalene sulfonate condensate, alkyl polyglycoside and a mixture thereof, an inorganic compound selected from the group consisting of attapulgite, magnesium aluminum silicate, silicon dioxide and aluminum oxide and glycerol.

In a preferred embodiment, clothianidin and an inorganic compound selected from the group consisting of attapulgite, magnesium aluminum silicate, silicon dioxide and aluminum oxide are dispersed in the composition and the at least one dispersant and glycerol are dissolved in the composition.

Clothianidin may be present in compositions of the present invention at a concentration from about 10% to about 30% w/w, preferably from about 15% to about 20% w/w, and more preferably from about 17% w/w to about 18% w/w.

Sodium alkyl naphthalene sulfonate condensate may be present in compositions of the present invention at a concentration from about 1% to about 10% w/w preferably from about 3% to about 8% w/w.

Alkyl polyglycoside may be present in compositions of the present invention at a concentration from about 1% to about 10% w/w, preferably from about 3% to about 8% w/w.

An inorganic compound selected from the group consisting of attapulgite, magnesium aluminum silicate, silicon dioxide and aluminum oxide may be present in the compositions of the present invention at a concentration from about 0.1% to about 5% w/w, preferably from about 0.5% to about 3% w/w.

Glycerol may be present in the compositions of the present invention at a concentration from about 1% to about 50% w/w, preferably from about 5% to about 40% w/w, and more preferably from about 15% to about 30% w/w.

Compositions of the present invention may further comprise, one or more excipients selected from the group consisting an additional antifreeze agent, an additional dispersant, an antifoaming agent, a preservative, a pH modifier and an additional thickening agent.

Additional antifreeze agents suitable for use in the present invention include, but are not limited to, ethylene glycol, propylene glycol, 1,2-butanediol, 1,3-butanediol, 1,4-butanediol, 1,4-pentanediol, 3-methyl-1,5-pentanediol, 2,3-dimethyl-2,3-butanediol, trimethylol propane, mannitol, sorbitol, pentaerythritol, 1,4-cyclohexanedimethanol, xylenol, and bisphenols such as bisphenol A.

Additional dispersants suitable for use in the present invention include, but are not limited to, an acrylic graft copolymer, optionally with polyvinylpyrrolidone; polyacrylates; ammonium polycarboxylates; sodium salt of polycarboxic acid; 1,4 bis(2-ethylhexyl)sodiumsulfosuccinate; polyether-polycarbonate sodium salt; maleic acid-olefin copolymer; ammonium polyacrylate; C6-C15 secondary alcohol and alkyl aryl sulfonate and mixtures thereof. In a preferred embodiment, the additional dispersant is an acrylic graft copolymer. The additional dispersants may be present individually or as a mixture at concentrations from about 0.1% to about 10% w/w, preferably from about 0.1% to about 5% w/w, more preferably from about 0.1% to about 1% w/w, and most preferably about 0.5% w/w.

Antifoaming agents suitable for use in the present invention include, but are not limited to, silicone antifoaming agents including silicone emulsions, vegetable oils, acetylenic glycols, and high molecular weight adducts of propylene oxide and lower polyoxyethylene and polyoxypropylene block polymers (wherein the number of octyl-, nonly- and phenylpolyoxyethylene/ethylene oxide units is >5) and long-chain alcohols and mixtures thereof. In a preferred embodiment, the antifoaming agent is a silicone emulsion. Antifoaming agents may be present at a concentration from about 0.01% to about 1% w/w, preferably from about 0.05% to about 0.5% w/w and more preferably about 0.3% w/w.

Preservatives suitable for use in the present invention include, but are not limited to, a 5-chloro-2-methyl-4-isothiazolin-3-one and 2-methyl-4-isothiazolin-3-one solution in water, such as Kathon® CG/ICP (available from Rohm and Haas Company) and Legend MK® (available from Rohm and Haas Company), 1,2-benzisothiazolin-3-one and a mixture of 1,2-benzisothiazolin-3-one and 6.5% 2-bromo-2-nitro-1,3-propanediol. In a preferred embodiment the preservative is 1,2-benzisothiazolin-3-one. Preservatives may be present at a concentration from about 0.001% to about 0.3% w/w, preferably from about 0.01% to about 0.3% w/w, more preferably from about 0.05% to about 0.2% w/w.

pH modifiers suitable for use in the present invention include, but are not limited to, hydrochloric acid, ascorbic acid, phosphoric acid, citric acid, sodium citrate, fumaric acid, sodium hydroxide, sodium bicarbonate, sodium carbonate, ammonium carbonate, and mixtures thereof. In a preferred embodiment, the pH modifier is phosphoric acid. pH modifiers may be present at a concentration from about 0.01% to about 1% w/w, preferably from about 0.01% to about 0.5% w/w, more preferably from about 0.04% to about 0.06% w/w or from about 0.1% to about 0.12% w/w and most preferably about 0.05% w/w or about 0.11% w/w.

Additional thickening agents suitable for use in the present invention include, but are not limited to, bentonite, fumed silica or mixtures thereof.

In another embodiment, the present invention is directed to agricultural compositions comprising clothianidin, at least one dispersant selected from the group consisting of sodium alkyl naphthalene sulfonate condensate, alkyl polyglycoside and a mixture thereof, an inorganic compound selected from the group consisting of attapulgite, magnesium aluminum silicate, silicon dioxide and aluminum oxide, glycerol and at least one liquid fertilizer.

The nutrients in the liquid fertilizers that are mixed with formulations of the present invention may be, for example, nitrogen, phosphorous, potassium or a mixture thereof. Fertilizer may be present at a concentration from about 1% to about 99% w/w. When fertilizer is present in the compositions of the invention the concentrations listed above for the remainder of the components of the composition will be based on % weight by weight of the composition that is not fertilizer. For example, if the composition of the present invention contains 50% w/w fertilizer then clothianidin may be present at a concentration from about 5% to about 15% w/w (i.e. from about 10% to about 30% w/w of 50% w/w).

In a preferred embodiment, the present invention is directed to agricultural compositions comprising clothianidin, at least one dispersant selected from the group consisting of sodium alkyl naphthalene sulfonate condensate, alkyl polyglycoside and a mixture thereof, an inorganic compound selected from the group consisting of attapulgite, magnesium aluminum silicate, silicon dioxide and aluminum oxide, glycerol and one or more excipients selected from the group consisting of an acrylic graft copolymer, a silicone emulsion, 1,2-benzisothiazolin-3-one and phosphoric acid and optionally, at least one liquid fertilizer.

In another preferred embodiment, the present invention is directed to agricultural compositions comprising clothianidin, at least one dispersant selected from the group consisting of sodium alkyl naphthalene sulfonate condensate, alkyl polyglycoside and a mixture thereof, an inorganic compound selected from the group consisting of attapulgite, magnesium aluminum silicate, silicon dioxide and aluminum oxide, glycerol and one or more excipients selected from the group consisting of an acrylic graft copolymer at a concentration from about 0.1% to about 10% w/w, a silicone emulsion at a concentration from about 0.01% to about 1% w/w, 1,2-benzisothiazolin-3-one at a concentration from about 0.001% to about 0.3% w/w, and phosphoric acid at a concentration from about 0.01% to about 1% w/w and optionally, at least one liquid fertilizer.

In another preferred embodiment, the present invention is directed to agricultural compositions comprising clothianidin, at least one dispersant selected from the group consisting of sodium alkyl naphthalene sulfonate condensate, alkyl polyglycoside and a mixture thereof, an inorganic compound selected from the group consisting of attapulgite, magnesium aluminum silicate, silicon dioxide and aluminum oxide, glycerol, an acrylic graft copolymer at a concentration from about 0.1% to about 10% w/w, a silicone emulsion at a concentration from about 0.01% to about 1% w/w, 1,2-benzisothiazolin-3-one at a concentration from about 0.001% to about 0.3% w/w, and phosphoric acid at a concentration from about 0.01% to about 1% w/w, wherein clothianidin is present at a concentration from about 10% to about 30% w/w, sodium alkyl naphthalene sulfonate condensate is present at a concentration from about 1% to about 10% w/w and alkyl polyglycoside is present at a concentration from about 1% to about 10% w/w, an inorganic compound selected from the group consisting of attapulgite, magnesium aluminum silicate, silicon dioxide and aluminum oxide is present at a concentration from about 0.1% to about 5% w/w, glycerol is present at a concentration from about 1% to about 40% w/w and optionally, at least one liquid fertilizer.

In another preferred embodiment, the present invention is directed to agricultural compositions comprising clothianidin, at least one dispersant selected from the group consisting of sodium alkyl naphthalene sulfonate condensate, alkyl polyglycoside and a mixture thereof, an inorganic compound selected from the group consisting of attapulgite, magnesium aluminum silicate, silicon dioxide and aluminum oxide, glycerol, an acrylic graft copolymer at a concentration from about 0.1% to about 1% w/w, a silicone emulsion at a concentration from about 0.05% to about 0.5% w/w, 1,2-benzisothiazolin-3-one at a concentration from about 0.05% to about 0.2% w/w, phosphoric acid at a concentration from about 0.01% to about 0.5% w/w, wherein clothianidin is present at a concentration from about 15% to about 20% w/w, sodium alkyl naphthalene sulfonate condensate is present at a concentration from about 3% to about 8% w/w, alkyl polyglycoside is present at a concentration from about 3% to about 8% w/w, an inorganic compound selected from the group consisting of attapulgite, magnesium aluminum silicate, silicon dioxide and aluminum oxide is present at a concentration from about 0.5% to about 3% w/w and glycerol is present at a concentration from about 15% to about 30% w/w and optionally, at least one liquid fertilizer.

In another embodiment, the present invention is directed to methods of protecting crop plants comprising:
  mixing an agricultural composition of the present invention with at least one liquid fertilizer to form a mixture; and
  applying the mixture to the plant, an area where the plant is growing, or an area where the plant is intended to grow.

As used herein, "where a plant is intended to grow" refers to the soil or planting medium that a plant or seed is or may be placed into. For example, a field or growing medium in a pot is a place where a grower may intend to grow a plant.

In another embodiment, the present invention is directed to methods of protecting crop plants comprising:
  (a) mixing an agricultural composition comprising clothianidin, at least one dispersant selected from the group consisting of sodium alkyl naphthalene sulfonate condensate, alkyl polyglycoside and a mixture thereof, an inorganic compound selected from the group consisting of attapulgite, magnesium aluminum silicate, silicon dioxide and aluminum oxide, glycerol with at least one liquid fertilizer to form a mixture; and
  (b) applying the mixture in at least one agricultural furrow.

The furrows may be made by a plow for example. The seeds or plants could then be placed into the furrow in order to grow.

Crop plants, which may be protected by compositions and methods of the invention include, but are not limited to, corn, wheat, soybeans, and alfalfa.

In another embodiment, the present invention is directed to methods of controlling a pest comprising:
  mixing an agricultural composition of the present invention with at least one liquid fertilizer to form a mixture; and
  applying the mixture to the pest or the pest's environment.

As used herein, "control" a pest or "controlling" pest(s) refers to killing, incapacitating, repelling, or otherwise decreasing the negative impact of the pest on plants or animals to a level that is desirable to the grower or animal.

As used herein, "pest's environment" refers to any area that the pest is present during any life stage. One environment likely to be treated by the methods of the present invention includes the plants that the pest is living on and the surrounding soil. The pest's environment may also include harvested plants, gardens, fields, greenhouses, or other buildings, and various indoor surfaces and structures, such as furniture including beds, and furnishings including books, clothing, etc.

The articles "a," "an" and "the" are intended to include the plural as well as the singular, unless the context clearly indicates otherwise. For example, the methods of the present invention are directed to controlling "pest" but this can include control of a multiple pests (such as a more than one insect or more than one insect species).

In another embodiment, the present invention is directed to methods of controlling a pest comprising:
  (a) mixing an agricultural composition comprising clothianidin, at least one dispersant selected from the group consisting of sodium alkyl naphthalene sulfonate condensate, alkyl polyglycoside and a mixture thereof, an inorganic compound selected from the group consisting of attapulgite, magnesium aluminum silicate, silicon dioxide and aluminum oxide, glycerol with at least one liquid fertilizer to form a mixture; and
  (b) applying the mixture to the pest or the pest's environment.

In a preferred embodiment, the pest is an insect.

Insects suitable for use in the present invention include, but are not limited to, wireworm and corn rootworm. Wireworms include those of the insect genus *Melanotus* and also *Agriotes mancus* and *Limonius dubitans*. Corn rootworms include Northern corn rootworm (*Diabrotica barberi*), Southern corn rootworm (*Diabrotica undecimpunctata*) and Western corn rootworm (*Diabrotica virgifera*).

As used herein, all numerical values relating to amounts, weight percentages and the like, are defined as "about" or "approximately" each particular value, plus or minus 10%. For example, the phrase "at least 5.0% w/w" is to be understood as "at least 4.5% to 5.5% w/w." Therefore, amounts within 10% of the claimed values are encompassed by the scope of the claims.

As used herein, the "liquid fertilizer" refers a fertilizer that is not solid but in a fluid form. The liquid fertilizers may contain amounts of micronutrients as required for enhanced growth of the treated plant. Any liquid fertilizer containing either nitrogen, phosphorus, or potassium, or any combination thereof, in any ratio thereof, may be suitable for use with the formulations of the present invention. In addition, other micronutrients, such as zinc may be added.

The disclosed embodiments are simply exemplary embodiments of the inventive concepts disclosed herein and should not be considered as limiting, unless so stated.

The following examples are intended to illustrate the present invention and to teach one of ordinary skill in the art how to make and use the invention. They are not intended to be limiting in any way.

EXAMPLES

TABLE 1

| | Example | | | | | | | | | |
|---|---|---|---|---|---|---|---|---|---|---|
| | #1 | #2 | #3 | #4 | #5 | #6 | #7 | #8 | #9 | #10 |
| Clothianidin | 17.0 | 17.0 | 17.0 | 17.0 | 17.0 | 17.5 | 17.5 | 17.5 | 17.5 | 17.5 |
| Tersperse ® 2500 | 0.50 | 0.50 | 0.50 | 0.50 | 0.50 | 0.50 | 0.50 | 0.50 | 0.50 | 0.50 |
| Morwet ® D-425 | 8.00 | 3.50 | 5.50 | 5.50 | 5.50 | 5.50 | 5.50 | 5.50 | 5.50 | 5.50 |
| Agnique ® PG 9116 | 3.00 | 8.00 | 8.00 | 8.00 | 8.00 | 8.00 | 8.00 | 8.00 | 8.00 | 8.00 |
| Stepfac ® TSP PE-K | — | — | — | — | — | — | — | — | — | — |
| Selvol ® 24-203 | — | — | — | — | — | — | — | — | — | — |
| Xiameter ® AFE-0010 | 0.30 | 0.30 | 0.30 | 0.30 | 0.30 | 0.30 | 0.30 | 0.30 | 0.30 | 0.30 |
| Surfynol ® 104PG-50 | — | — | — | — | — | — | — | — | — | — |
| Attaflow ® FL (21% disp.) | 12.5 | 12.5 | 12.5 | 8.00 | 12.5 | 10.0 | — | — | — | — |
| Attagel ® 40 | — | — | — | — | — | — | 1.00 | 1.50 | 1.80 | 2.10 |
| Veegum ® R | — | — | — | — | — | — | — | — | — | — |
| Aerodisp ® 7622 | — | — | — | — | — | — | — | — | — | — |
| Aerosil ® 200 | — | — | — | — | — | — | — | — | — | — |
| Aeroxide ® Alu C | — | — | — | — | — | — | — | — | — | — |
| Kelzan ® CC | — | — | — | — | — | — | — | — | — | — |
| Proxel ® GXL | 0.05 | 0.05 | 0.05 | 0.05 | 0.05 | 0.05 | 0.05 | 0.05 | 0.05 | 0.05 |
| Kathon ® CG/ICP | — | — | — | — | — | — | — | — | — | — |
| Glycerol | 30.0 | 30.0 | 30.0 | 15.0 | 30.0 | 15.0 | 15.0 | 15.0 | 15.0 | 15.0 |
| Sorbitol 70% solution | — | — | — | — | — | — | — | — | — | — |
| Propylene glycol | — | — | — | — | — | — | — | — | — | — |
| Phosphoric acid (85%) | 0.05 | 0.05 | 0.04 | 0.11 | 0.11 | 0.11 | 0.11 | 0.11 | 0.11 | 0.11 |
| Michem ® Lube 156P | — | — | — | — | — | — | — | — | — | — |
| Water | Q.S. | Q.S. | Q.S. | Q.S. | Q.S. | Q.S. | Q.S. | Q.S. | Q.S. | Q.S. |
| Total w/w % | 100 | 100 | 100 | 100 | 100 | 100 | 100 | 100 | 100 | 100 |

| | Example | | | | |
|---|---|---|---|---|---|
| | #11 | #12 | #13 | #C1 | #C2 |
| Clothianidin | 17.5 | 17.5 | 17.5 | 23.0 | 17.5 |
| Tersperse ® 2500 | 0.50 | 0.50 | 0.50 | 1.04 | 0.50 |
| Morwet ® D-425 | 5.50 | 5.50 | 5.50 | — | 5.50 |
| Agnique ® PG 9116 | 8.00 | 8.00 | 8.00 | — | 8.00 |
| Stepfac ® TSP PE-K | — | — | — | 0.37 | — |
| Selvol ® 24-203 | — | — | — | 2.71 | — |
| Xiameter ® AFE-0010 | 0.30 | 0.30 | 0.30 | 0.05 | 0.30 |
| Surfynol ® 104PG-50 | — | — | — | 0.10 | — |
| Attaflow ® FL (21% disp.) | — | — | — | — | — |
| Attagel ® 40 | — | — | — | — | — |
| Veegum ® R | 0.50 | — | — | — | 0.50 |
| Aerodisp ® 7622 | — | 1.50 | — | — | — |
| Aerosil ® 200 | — | — | 1.00 | — | — |
| Aeroxide ® Alu C | — | — | 0.20 | — | — |
| Kelzan ® CC | — | — | — | 0.29 | — |
| Proxel ® GXL | 0.20 | 0.20 | — | — | 0.20 |
| Kathon ® CG/ICP | — | — | — | 0.10 | — |
| Glycerol | 15.0 | 15.0 | 15.0 | 3.04 | — |
| Sorbitol 70% solution | — | — | — | 3.04 | — |
| Propylene glycol | — | — | — | — | 15.0 |
| Phosphoric acid (85%) | 0.11 | 0.11 | 0.11 | — | 0.11 |

TABLE 1-continued

| | | | | | |
|---|---|---|---|---|---|
| Michem ® Lube 156P | — | — | — | — | — |
| Water | Q.S. | Q.S. | Q.S. | Q.S. | Q.S. |
| Total w/w % | 100 | 100 | 100 | 100 | 100 |

Tersperse® 2500 is used as the source of the 35% acrylic graft copolymer and is available and a registered trademark of from Huntsman Petrochemical. Tersperse® 2500 has a density of 1.07 g/mL at 25° C., a flash point of greater than 100° C., a pour point of less than 0° C., and a viscosity of 200 mPa·s at 25° C.

Morwet® D-425 is used as the source of sodium alkyl naphthalene sulfonate condensate and is a registered trademark of and available from Akzo Nobel Surface Chemistry LLC.

Agnique® PG 9116 (CAS #132778-08-6) is used as the source of alkyl polyglycoside and is available from BASF and a registered trademark of Cognis Corporation.

Xiameter® AFE-0010 (CAS #63148-62-9) is used as the source of silicone emulsion and is available from and a registered trademark of Dow Corning Corporation.

Proxel® GXL (CAS #2634-33-5) is used as the source of 1,2-benzisothiazolin-3-one and is available from and a registered trademark of Arch Chemicals, Inc.

Attagel® 40 (CAS #12174-11-7) is used as the source of attapulgite clay and is a registered trademark of and available from BASF SE.

Attaflow® FL (CAS #8031-18-3) is used as the source of attapulgite 21% suspension and is a registered trademark of and available from BASF Catalysts LLC.

Veegum® R (CAS #1302-78-9) is used as the source of magnesium aluminum silicate and is available from Vanderbilt Minerals, LLC.

Aerosil® 200 (CAS #112 945-52-5) is used as the source of silicone dioxide and is available from Evonik Industries.

Aerodisp® W 7622 (CAS #112 945-52-5) is used as the source of a water-based dispersion of silicone dioxide and is available from Evonik Industries.

Aeroxide® Alu C (CAS #1344-28-1) is used as the source of aluminum oxide and is available from Evonik Industries.

Stepfac® TSP PE-K (CAS #163436-84-8) is used as the source of polyoxyethylene tristyrylphenol phosphate, potassium salt and is a registered trademark of and available from Stepan Company.

Selvol® 24-203 (CAS #25213-24-5) is used as the source of polyvinyl alcohol, partially hydrolyzed (24% solution in water) and is a registered trademark of and available from Sekisui Specialty Chemicals America LLC.

Surfynol® 104PG-50 (CAS #126-86-3) is used as the source of 2,4,7,9-tetrmethyl-5-decyne-4,7-diol (50% solution in propylene glycol) and is a registered trademark of and available from Air Products and Chemicals Inc.

Kelzan® CC (CAS #11138-66-2) is used as the source of xanthan gum and is a registered trademark of and available from CP Kelco.

Kathon® CG/ICP (CAS #26172-55-4 and 2682-20-4) is used as the source of 5-chloro-2-methyl-4-isothiazolin-3-one and 2-methyl-4-isothiazolin-3-one, solution in water. They are a registered trademark of and available from Rohm and Haas Company.

Michem® Lube 156P (CAS # proprietary) is used as the source of carnauba wax (25% emulsion in water) and is a registered trademark of and available from Michelman Inc.

Example 1—Preparation of a Liquid Formulation of the Present Invention

A formulation was prepared by combining the components listed in Table 1, above. A slurry was prepared by combining all of the components under high shear except the thickening agent. The thickening agent was dispersed in water under high shear to make an inorganic compound pregel. Next, the slurry was milled using an Eiger® mill to obtain an average particle size $D_{50}$ of around 2 micrometers. To the recovered mill base, the inorganic compound pregel was added and mixed to make the final product. The final product is then ready to be added to a liquid fertilizer.

Example 2—Preparation of a Liquid Formulation of the Present Invention

A slurry was prepared by combining all of the components in Table 1, above, under high shear. Next, the slurry was milled using an Eiger® mill to obtain an average particle size $D_{50}$ of around 2 micrometers to make a final product. The final product is then ready to be added to a liquid fertilizer.

Example 3—Compatibility Tests of Liquid Formulations of the Present Invention

Method 49 mL of liquid fertilizer (N—P—K: 10-34-0) was added to 15 separate 50-mL graduated cylinder. Examples #1-#13 and Comparative examples #C1 and #C2 were then each added to separate 50-mL graduated cylinder to form a mixture. The mixtures were inverted 10 times at a rate of 2 seconds per inversion. The mixtures were then left at room temperature undisturbed for 24 hours. After 24 hours, the mixtures were inverted to re-homogenize. After the mixtures were dispersed, the mixtures were ran through a 150-micrometer filter. Any residue remaining on the filter was recorded.

Results

Examples #1 to #13 left very little or no residue on the filter. Comparative examples #C1 and #C2 left a relatively large amount of residue that impeded the flow of the mixture.

Example 4—Flowability Tests of Liquid Formulations of the Present Invention

Method

Around 75 grams of each of Examples #1-#11 and comparative examples #C1 and #C2 were each placed in 125 mL polypropylene bottles. The bottles were then stored at 54° C. for 2 weeks undisturbed. Additionally, around 75 grams of each of Examples #6-#13 and comparative examples #C1 and #C2 were each placed in 125 mL polypropylene bottles. The bottles were then stored at 50° C. for 8 weeks undisturbed. After storage the bottles were taken out of the oven and placed at room temperature to cool. After reaching room temperature, the samples were tilted to 90°.

Results

All examples including the comparative example flowed when tilted to 90°.

What is claimed is:

1. An agricultural composition comprising:
   from about 10% to about 30% w/w clothianidin as the sole pesticide;
   sodium alkyl naphthalene sulfonate condensate;
   alkyl polyglycoside;
   from about 0.1% to about 10% w/w of an acrylic graft copolymer;
   from about 0.01% to about 1% w/w of a silicone emulsion;
   from about 0.001% to about 0.3% w/w 1,2-benzisothiazolin-3-one; and
   from about 0.01% to about 1% w/w phosphoric acid,
   an inorganic compound selected from the group consisting of
   attapulgite, magnesium aluminum silicate, silicon dioxide and aluminum oxide; and
   from about 15% to about 30% w/w glycerol;
   wherein w/w denotes weight by total weight of the formulation.

2. The composition of claim 1, wherein clothianidin and the inorganic compound are dispersed in the composition and the at least one dispersant and glycerol are dissolved in the composition.

3. The composition of claim 1, wherein sodium alkyl naphthalene sulfonate condensate is present at a concentration from about 1% to about 10% w/w, wherein w/w denotes weight by total weight of the formulation.

4. The composition of claim 1, wherein alkyl polyglycoside is present at a concentration from about 1% to about 10% w/w, wherein w/w denotes weight by total weight of the formulation.

5. The composition of claim 1, wherein the inorganic compound is selected from the group consisting of attapulgite, magnesium aluminum silicate, silicon dioxide and aluminum oxide is present at a concentration from about 0.1% to about 5% w/w, wherein w/w denotes weight by total weight of the formulation.

6. The composition of claim 1, wherein the sodium alkyl naphthalene sulfonate condensate is at a concentration from about 1% to about 10% w/w, the alkyl polyglycoside is at a concentration from about 1% to about 10% w/w, and the inorganic compound is at a concentration from about 0.1% to about 5% w/w.

7. The composition of claim 1, wherein the acrylic graft copolymer is at a concentration from about 0.1% to about 1% w/w, the silicone emulsion is at a concentration from about 0.05% to about 0.5% w/w, 1,2-benzisothiazolin-3-one is at a concentration from about 0.05% to about 0.2% w/w, phosphoric acid is at a concentration from about 0.01% to about 0.5% w/w, clothianidin is at a concentration from about 15% to about 20% w/w, sodium alkyl naphthalene sulfonate condensate is at a concentration from about 3% to about 8% w/w, alkyl polyglycoside is at a concentration from about 3% to about 8% w/w, and the inorganic compound is at a concentration from about 0.5% to about 3% w/w.

* * * * *